US006892724B1

(12) United States Patent
Niedermeyer

(10) Patent No.: US 6,892,724 B1
(45) Date of Patent: May 17, 2005

(54) SOLAR ENERGY COLLECTOR FOR HOT WATER

(75) Inventor: William P. Niedermeyer, 1024 Mt. Mary Dr., Green Bay, WI (US) 54311

(73) Assignee: William P. Niedermeyer, Green Bay, WI (US)

(*) Notice: Subject to any disclaimer, the term of this patent is extended or adjusted under 35 U.S.C. 154(b) by 0 days.

(21) Appl. No.: 10/712,143

(22) Filed: Nov. 14, 2003

(51) Int. Cl.$^7$ ................................................. F24J 2/12
(52) U.S. Cl. ....................... 126/694; 126/696; 126/655
(58) Field of Search ............................. 126/694, 696, 126/634, 651, 655, 906

(56) References Cited

U.S. PATENT DOCUMENTS

| | | | | |
|---|---|---|---|---|
| 4,296,736 A | * | 10/1981 | Soot | 126/621 |
| 4,396,009 A | * | 8/1983 | Enga | 126/675 |
| 4,561,424 A | * | 12/1985 | Gill et al. | 126/694 |
| 4,779,610 A | * | 10/1988 | Hultmark | 126/641 |

FOREIGN PATENT DOCUMENTS

| | | | |
|---|---|---|---|
| CH | 631 256 A | * | 7/1982 |
| JP | 56-67804 A | * | 6/1981 |

* cited by examiner

Primary Examiner—Josiah C. Cocks

(57) ABSTRACT

A solar energy concentrating collector having a frame with bottom, end and side panels of corrugated material adapted to include secondary side panels that are folded inward and have vertical slots for containment of parabolic supports for a flexible reflective surface placed on top of the supports. Frame end panels have apertures located on the parabolic focal line for connection of fluid conduits outside the frame. For arrangement in solar collector arrays, conduit apertures in end-to-end mounted collectors are aligned to receive a common absorber pipe that extends through and beyond a plurality of collector frames for external connections to conduits in the next adjacent parabolic reflective surface parallel to the first reflective surface in the same frame. Supports for the reflective surface have parabolic cutouts in the top portion and are processed as multiple side by side components in a corrugating machine. The preferred material is corrugated paperboard.

11 Claims, 3 Drawing Sheets

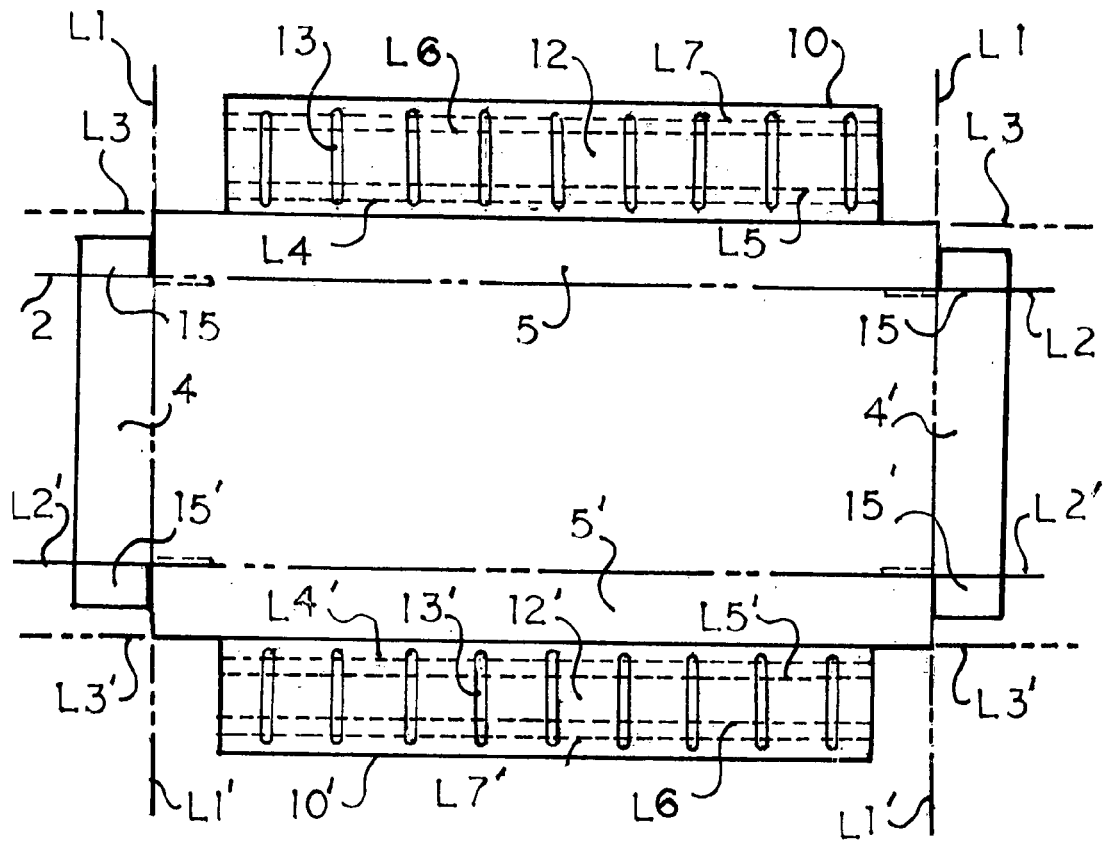
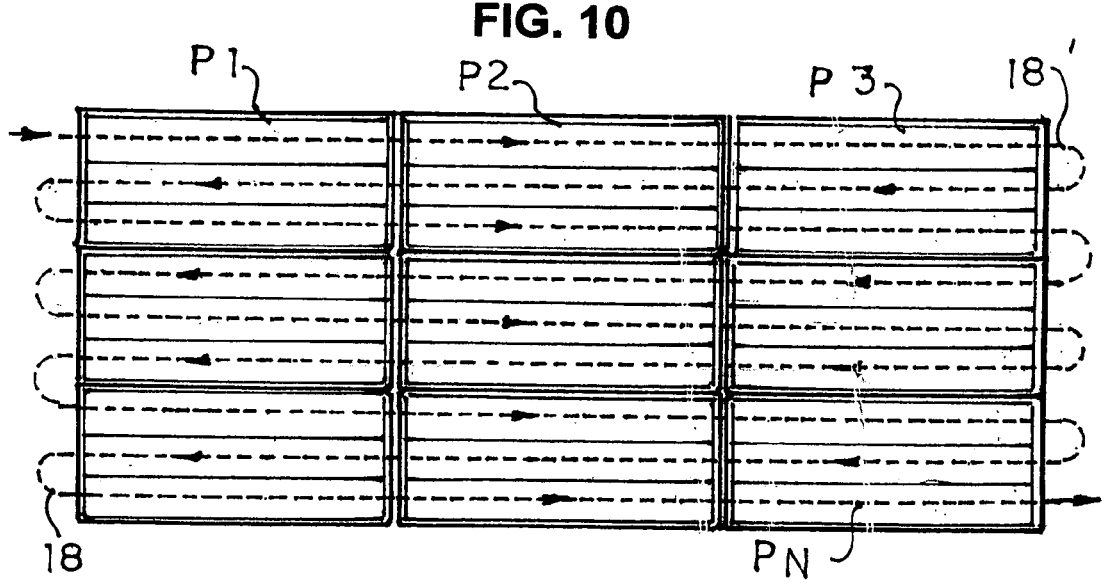

SOLAR ENERGY COLLECTOR FOR HOT WATER

BACKGROUND AND SUMMARY

Presently, most solar collectors for hot water heating in residential and industrial applications include rigid frames (usually metal) with a conductive absorber plate having attached fluid conduits or a double plate absorber having internal fluid passages, plus glazing, gaskets, etc. to enclose the absorber within the frame.

Flat plate collectors have the inherent ability to absorb indireect solar rays, for example during partially cloudy weather or days with thin cirrus type clouds, and are usually installed in arrays on rooftops with fixed slopes, or on framework with fixed slopes mounted on flat roofs of commercial buildings and factories. When arrays are mounted at ground level, fixed slopes are used.

For low temperature fluid heating, parabolic concentrating collectors are not preferred since they require direct sunlight and changes in the mountng angle to keep solar rays focused on the fluid absorber pipe due to seasonal changes in the solar angle.

Primarily because of weight, flat plate collectors are installed with fixed slope.

For higher solar insolation, frames to adjust for angular orientation and its beneficial effect on the amount of solar heat collected are well known, but present practice avoids adjustable framework for flat plate or concentrating designs at the expense of higher system efficiency.

This invention addresses reasons the prime reason for avoiding adjustable frames, etc., by using lightweight, inexpensive corrugated paperboard materials and folding techniques to construct a concentrating collector suitable for mounting multiple collector panels in arrays that are pivotable and isolated from building surfaces.

The instant collector defines conduit arrangements that minimize external conduit connections all in the quest for lower panel and system installation costs to make solar heat more competive with conventional fuels for heating water.

Prior art, U.S. Pat. No. 4,190,037 describes use of corrugated material for reflector surface supports but fails to anticipate use and folding of extended side panels to provide positioning and retention means for the supports. Patent '037 also describes fluid manifolds for only parallel flow but does not anticipate the unique advantages of absorber pipe connections for serial flow and the reduction in number of couplings needed to complete an array while the frame is still adjustable.

The instant collector relies on the same operating principles as '037 and is an improvement thereof by defining a fabricated blank that folds into a collector panel having integral inside walls with vertical slots that locate and retain the parabolic supports and thus eliminates the separately molded frames and the additional components required by '037.

With the above and other objectives in view, more information and understanding of the invention and its use for supplemental heating of fluids may be achieved by reference to the detailed description hereinafter.

BRIEF DESCRIPTION OF THE DRAWINGS

FIG. 5 is a plan view of an unfolded corrugated blank illustrating fabrication of cutouts, slots, score lines for folding, and apertures for conduit entry-exit.

FIG. 10 is a plan view of a collector array illustrating use of extended length conduits as absorbers for a plurality of end to end mounted collectors using minimum external conduit connectors for an array.

DETAILED DESCRIPTION OF THE INVENTION

Figure 1:
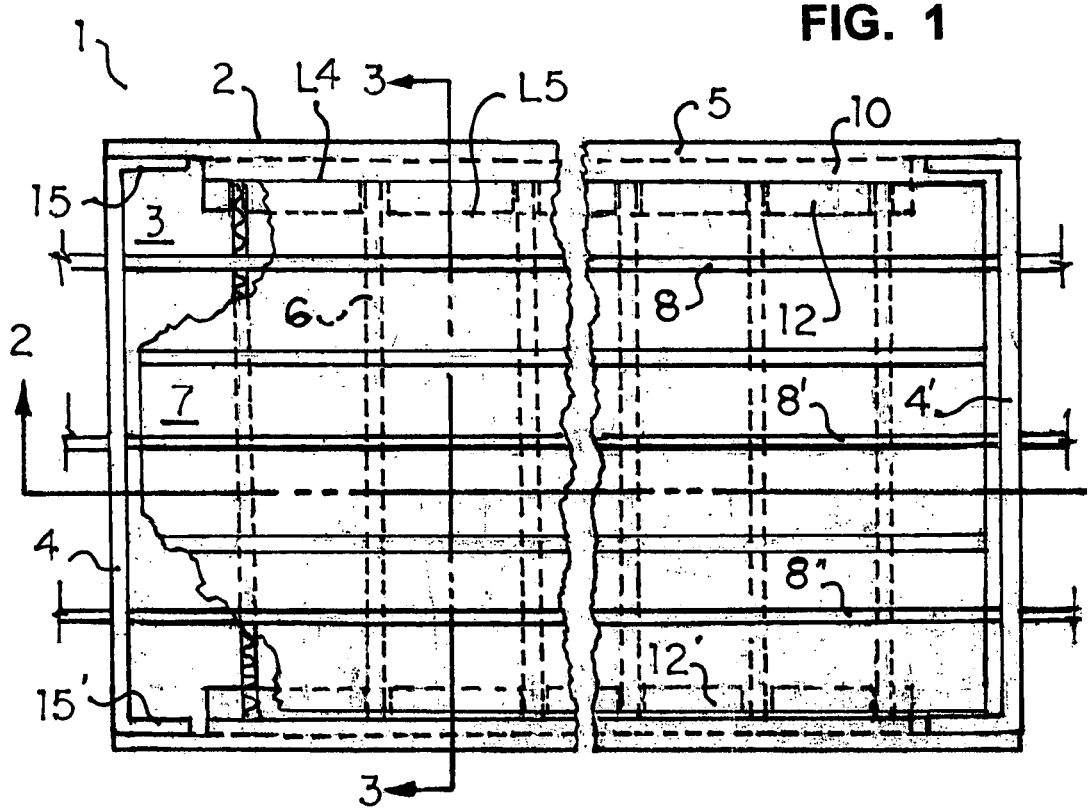
FIG. 1 is a plan view of the instant collector with portions removed illustrating construction of the container 'tray', secondary side panel folds with slots for containment of parabolic shaped refector supports and conduits extending from each end for interconnection between conduits in adjacent reflectors.
Figure 6:
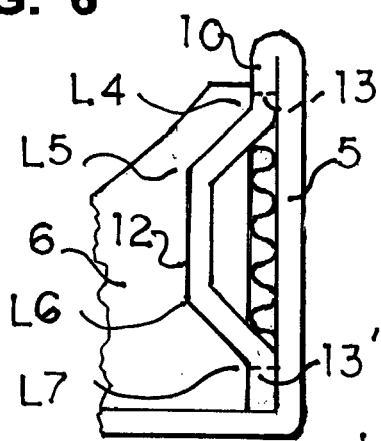
FIG. 6 is an enlarged section of one side panel similar to FIG. 3 illustrating foldover of a co-extensive secondary side panel for support containment.

In FIG. 1, solar collector panel 1 consists of a frame having a bottom surface 3, folded primary end panels 4, 4', primary side panels 5, 5' and in the preferred embodiment, inwardly folded secondary side panel extensions 10, 10' (see FIG. 6).

In FIG. 1, parabolic supports 6 (see FIGS. 3, 4) support reflector surface 7 (shown cutaway on the left side) and are held in slot cutouts 13 in the inside folded secondary side panels 10, 10'. Reflector surface 7 is bonded to an insulating substrate 17 (see FIG. 3) and focuses solar rays to absorbing collector conduit 8.

In FIG. 1, surface 7 extends between the inside folded secondary side panels 10, 10' and substantially between folded primary end panels 4, 4'.

Figure 2:
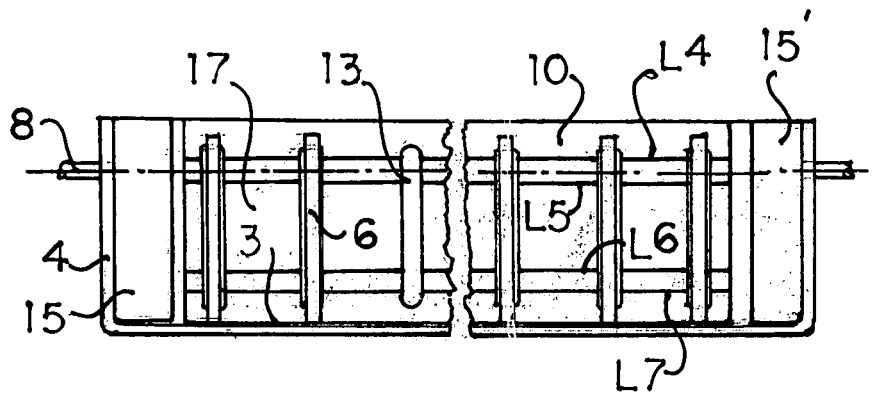
FIG. 2 is a sectional side elevation with central portions removed and viewed from 2—2 of FIG. 1 illustrating corner folded end panel tabs to connect end and side panels, inside folded side panel extenions with parabolic support containment slots. Reflector surface not shown.

In FIG. 2, the third slot 13 is shown without the support 6 to define its shape and length, noting that the upper slot end is above score/fold line L4 and the bottom end is below score/fold line L7 to insure that ends of support 6 butt against surfaces of panels 10, 10'.

Figure 3:
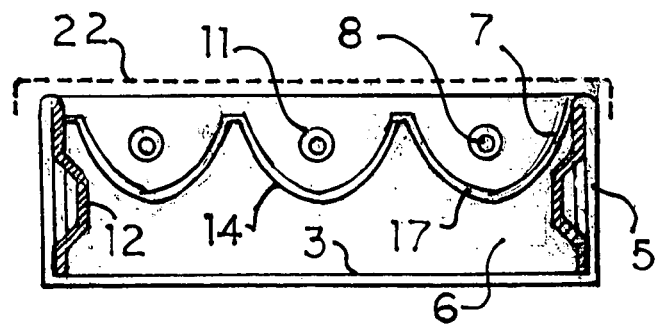
FIG. 3 is a sectional end elevation viewed from 3—3 of FIG. 1 illustrating placement and containinmenr of parabolic shaped support ends within slots in projections of the inside folded secondary side panel.

In FIG. 3, absorber conduits 8 passes thru apertures 11 in the folded primary end panels. Vertical supports 6 with a parabolic shape 14 on the upper margin are held in slots 13 cut out from side projections 12 and support substrate 17 and superposed reflector surface 7.

Figure 4:
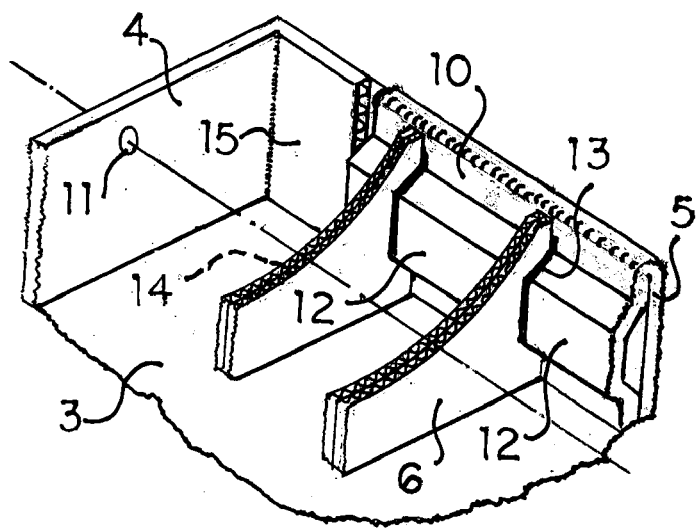
FIG. 4 is a top perspective view of a collector corner illustrating folded tab ends for attaching ends and sides, inside panel folds, slots for supports, and a reflector surface.

In FIG. 4, cutaway supports 6 are shown without the substrate and reflector surface for clarity. Slots 13 are shown spaced from support 6 to illustrate cut out above upper fold line L4 and below lower line L7.

In practice slots 13 butt against support side surfaces without space.

Figure 7:
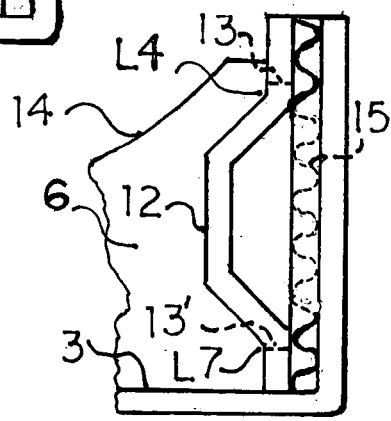
FIG. 7 is an enlarged section of one side panel similar to FIG. 3 illustrating use of a separately fabricated secondary panel with a folded projection for reflector support slots.

In FIG. 4, inside folded secondary side panel 10 is scored and folded to define projections 12 containing support containment slots 13 (see FIGS. 6, 7).

In FIG. 5, a corrugated paperboard rectangular blank is fabricated with scored fold lines L1—L1' for end panels 4, 4', scored fold lines L2—L2' for primary side panels 5—5', and L3—L3' for folded secondary (extended) side panels 10, 10'.

In FIG. 5, co-extended folded secondary panels 10, 10' are shorter than inside panel length to avoid interference with end panel 'tabs' 15, 15' which are folded inside at the corners. Leaving uncut space at the ends of panels 10. 10', the first and last slots are therefore spaced from the inside of primary panel ends and the reflector substrate and surface are cantilivered between first and last supports and the respective end panels.

In enlarged FIG. 6, the preferred arrangement shows the overfolded secondary panel 10, upper fold line L4, top score/fold line L5 and L6 for projection 12, and lower fold line L7 to bring the bottom of panel 10 into surface contact with, and attachment to, primary side panel 5. Upper slot cut line 13 and lower cut line 13' (as described above) are shown phantom.

In another embodiment of FIG. 7, a separate corrugated piece is scored and folded with projections 12 and attached to an intermediate separately processed corrugated piece (not referenced) to allow a different assembly procedure versus the overfolds of panel 10 described above.

Figure 8:
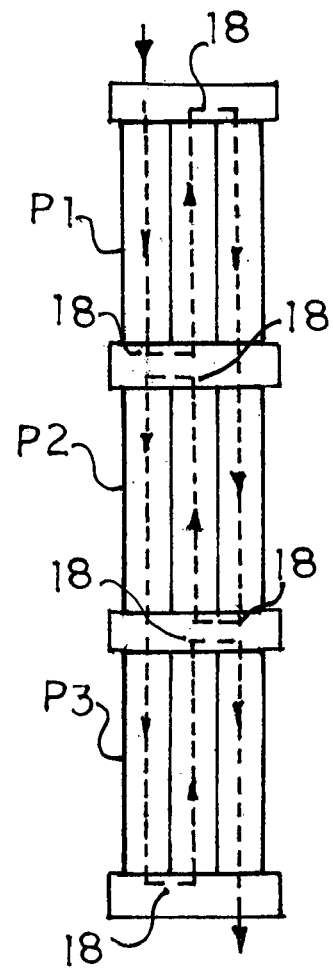
FIG. 8 is a simplified plan view illustrating external conduit connections for serial fluid flow within a single collector. Conduits penetrate through film overwrap (not shown) and end panel apertures

In FIG. 8, collector panels 1 are arranged serially as an array with panels P1, P2, and P3. In this instance, connections 18 between adjacent conduits in a panel are external and in the example shown require 6 connectors between and at the ends of a 3 panel collector array.

Figure 9:
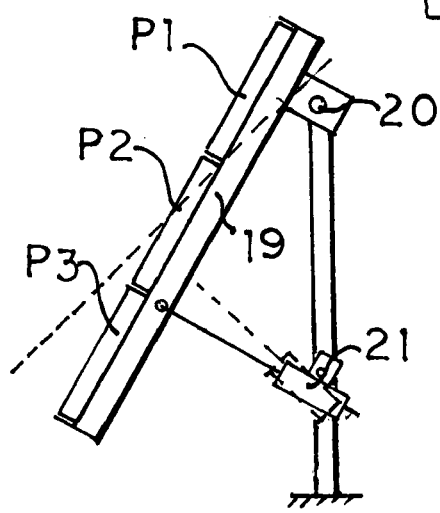
FIG. 9 is a simplified side elevation of a framework for a collector array illustrating pivotable mounting to adjust for seasonal change in solar angles.

In FIG. 9, a typical framework 19 for an array is rotatably mounted at pivot 20 and includes means 21 to change the framework angle for seasonal change in the solar angle. Arranged as shown in 9, solar panels require 17 external connections for serial flow through the array.

In FIG. 10, conduits having a length for three panels long are serially connected at ends 18 to an adjacent conduit for an adjacent parabolic reflector surface, with eight (8) connectors used to connect longer conduits at the ends and at the inlet and outlet versus the 17 conectors are used for an equivalent 9 panel array involving three arrays shown in FIG. 8.

These material savings and lower assembly requirements lower system costs for supplemental solar hot water heating.

It is understood that the present invention may be embodied in other specific forms without departing from the spirit or special atributes hereof, and it is, therefore, desired that the present embodiments be considered in all aspects as illustrative and therefore not restrictive, reference being made to the foregoing description to indicate the scope of the invention.

Having thus described my invention, what I claim as new and desire to protect by Letters Patent are the following:

1. A concentrating solar collector for hot water heating comprising;

A rectangular shaped frame having a major dimension and a width, including a bottom surface, vertical end panels and side panels of pre-determined height, A plurality of planar vertical supports for a parabolic reflector surface, An odd numbered plurality of reflector surfaces, An odd numbered plurality of heat absorbing conduits, wherein:

said frame is made from a non-conducting substrate having a plurality of inner and outer sheets with at least one corrugated intermediate sheet, said frame substrate is shaped to include a bottom area, folded primary end panels, primary side panels equal to the height of the frame, and inside folded secondary co-extensive side panels, said folded primary end panels each having a plurality of of apertures spaced transversely a distance equal to the distance between focal points of adjacent parabolic curves, said inside folded secondary side panels folded inside of the primary side panels to define at least one folded projection with slot cutouts for containment of said planer vertical supports, said planar supports including an odd numbered plurality of adjacent parabolic shaped cutouts along the top margin, a plurality of reflector surfaces having a pre-selected length and a total reflective width substantially equal to the sum of adjacent parabolic surfaces, each of said apertures in the folded primary end panels centered along a focal line below the upper margins of said folded primary ends panels, and passing through said folded primary end panels for serial connection to a coacting absorber conduit, the first and last of said serially connected absorber conduits connected to inlet and outlet fluid piping respectively.

2. In a collector of claim 1 wherein said collector frame includes a corrugated paperboard blank with tabs extending fromend panels, score lines for folding end and side primary panels, and score lines for folding the secondary side panels inside the frame for superposed attachment to the primary side panels.

3. The collector of claim 2 wherein said inside folded secondary panels have a plurality of scores lines in the direction of the major frame direction to form at least one inside folded projection.

4. The collector of claim 3 wherein secondary side panels have vertical slots extending above one score line and below another of said score lines.

5. The collector of claim 4 wherein said slots have a width substantially equal to the width of a reflector surface support.

6. The collector of claim 1 wherein each support includes an odd numbered plurality of parabolic shaped cutouts along the upper margin.

7. The collector of claim 1 wherein the supports include inside corrugations oriented vertically and perpendicular to the plane of the bottom panel.

8. The collector of claim 1 wherein the reflector surface includes an underlying flexible non-conductive substrate and a superposed reflective sheet bonded to the upper surface thereof.

9. The collector of claim 6 wherein the apertures in the folded primary end panels equal the number of parabolic cutouts in another collector installed end to end relationship with said collector.

10. The collector of claim 1 wherein said heat absorbing conduit extends beyond the frame and coacts with a corresponding reflective surface in an adjacent collector.

11. The collector of claim 10 wherein parallel extended conduits of adjacent parabolic reflectors are connected externally of the collector frame for serial fluid flow.

* * * * *